United States Patent [19]
Hall

[11] Patent Number: 4,753,447
[45] Date of Patent: Jun. 28, 1988

[54] FRONT BUMPER STEP FOR TRUCKS

[76] Inventor: Anthony Hall, Rte. 1, Box 96, Lewisport, Ky. 42351

[21] Appl. No.: 918,022

[22] Filed: Oct. 14, 1986

[51] Int. Cl.[4] .................................................. B60R 3/02
[52] U.S. Cl. ...................................... 280/163; 182/92; 182/127
[58] Field of Search ........................ 182/90, 92, 127; 280/163, 164 R, 166; 269/181

[56] References Cited

U.S. PATENT DOCUMENTS

| | | | |
|---|---|---|---|
| 2,378,678 | 6/1945 | Anderson | 280/163 X |
| 2,981,554 | 4/1961 | Mulder et al. | 280/164 R |
| 3,017,949 | 1/1962 | Harlan | 182/92 |
| 3,159,242 | 12/1964 | James | 182/92 |
| 3,357,719 | 12/1967 | McCrea | 280/163 |
| 4,017,093 | 4/1977 | Strecker, Sr. | 280/163 |
| 4,057,125 | 11/1977 | Kroft | 182/92 X |
| 4,274,648 | 6/1981 | Robins | 182/92 X |
| 4,405,141 | 9/1983 | Jurek | 280/163 |

FOREIGN PATENT DOCUMENTS 648441  1/1951  United Kingdom ................ 182/92

*Primary Examiner*—David M. Mitchell
*Assistant Examiner*—Michael Mar

[57] ABSTRACT

An adjustable, temporary step or platform is shown for mounting on the front bumper of heavy-duty motor vehicles such as trucks and buses. A pair of L-shaped structural members are spaced apart and fitted with a wide platform panel for supporting both feet of the user. Each L-shaped member has a vertical post that is provided with a pair of vertically spaced through bolts that are adjustably mounted to the post. Both bolts are threaded bolts and the top bolt has a down-turned hook formed on the outermost end that is adapted to engage over a top flange of a bumper. The bottom bolt has a rubber or plastic fitting formed on its outermost end that is adapted for engagement with a front wall of a bumper. This unit has been designed so that it is adjustable without the use of tools. A second modification employs a horizontal, elongated, adjustable rod connected between the two bottom bolts for making a quick connection therewith, where each end of the elongated rod is provided with an elongated hole located within the hollow post for receiving the bottom bolt therein with a slip fit. One end wall of each elongated hole in the elongated rod is provided with a concave, semicircular, threaded configuration for locking engagement with the threads of the adjacent bottom bolt when the rod is shifted into engagement therewith and serving in the manner of a split nut.

2 Claims, 3 Drawing Sheets

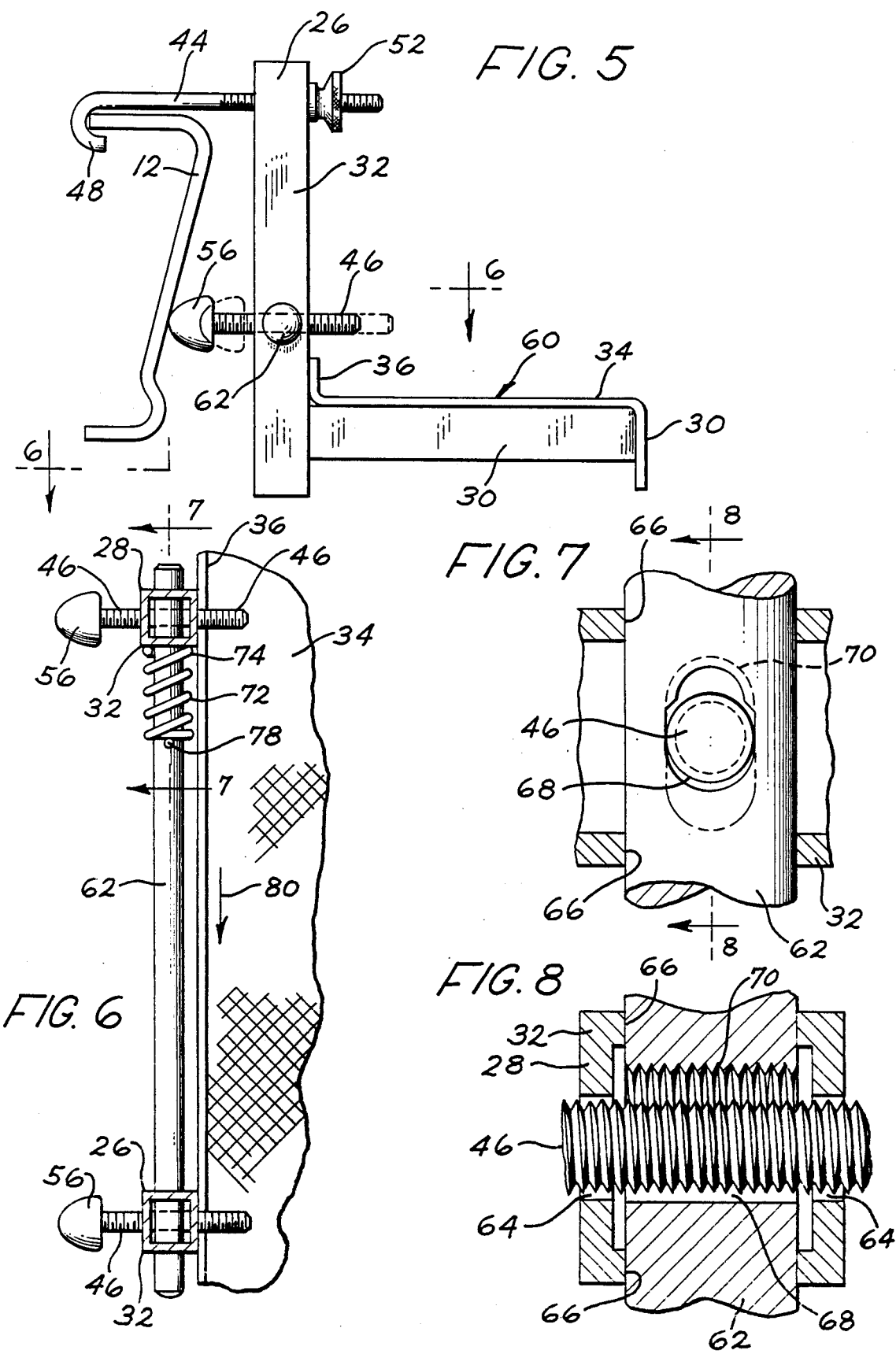

FRONT BUMPER STEP FOR TRUCKS

BACKGROUND OF THE INVENTION

1. Field of the Invention

This invention relates to a portable, temporary step which can be clamped upon the front bumper of a motor vehicle such as a pickup truck, van, recreational vehicle, school bus, or the like, for use by a mechanic in servicing the vehicle. Such vehicles are larger than the normal private automobile, and it is not possible for a mechanic to work under the hood of the vehicle while standing on the ground. The mechanic must elevate himself so that he can reach the motor and other subassemblies mounted under the hood of the vehicle.

2. Description of the Prior Art

Other people have realized the danger of a mechanic trying to stand on the narrow front bumper of such a vehicle or to use a kitchen stool, an extension ladder, milk bucket, or crate.

The Kroft U.S. Pat. No. 4,057,125 describes a service platform for removable mounting on a front vehicle bumper. This is a hinged design and it has hook members for engaging the rear of the top surface of the bumper. An adjustment means is used to engage the front of the bumper for leveling the platform. There is a lower step member welded to the underside of the platform to assist in gaining access to the top planar platform member. This design appears to be a two-step arrangement for use with large tractor vehicles.

The Robbins U.S. Pat. No. 4,274,648 shows a vehicle bumper step for use with large tractor vehicles or buses. It is a two-piece step formed by an upwardly open frame having clamp members secured to its upper surface for mounting the frame on a vehicle bumper by gripping a bumper flange. A step having a tread portion is movable from a first position nested vertiacally within the frame to a second position projecting horizontally and forwardly of the bumper. It includes a hook portion engaging the frame and normally preventing separation of the step from the frame.

The Cross U.S. Pat. No. 3,627,350 describes a retractable step for use with an automotive vehicle. It is described as a bumper flip step, where the step is acutally bolted to the front of the bumper. Hinge bearing blocks accommodate a horizontal bar. In one position the step is in a horizontal use position, and in another position it is in its pivoted, raised, or stowed, position.

The Jurek U.S. Pat. No. 4,405,141 shows a pair of individual serving steps that are mounted on the front bumper of a truck, where each step accommodates one foot of the user. Each step has a hook portion that engages over the top flange of the bumper, and it has an optional brace having on its extreme end a foot covered with rubber or plastic to prevent scratching the bumper.

The Everest et al U.S. Pat No. 2,957,541 describes an automobile mechanic's appliance which is not mounted on the bumper but is in the form of a ladder having a plurality of vertically spaced rungs or steps.

OBJECTS OF THE PRESENT INVENTION

The principal object of the present invention is to provide a front bumper step for use with a heavy-duty motor vehicle where the step is wide enough to support both feet of the user, and the step is supported by a plurality of threaded bolts that may be adjusted without the use of tools for accommodating different bumper configurations.

A further object of the present invention is to provide a front bumper step of the class described where the step is adjusted upwardly so as to shift the center of gravity of the user toward the vehicle so that the user's feet will be urged to stay on the platform.

A further object of the present invention is to provide a lightweight, portable, front bumper step of universal design that can be used on most any front bumper and can be installed quickly without the use of tools.

SUMMARY OF THE INVENTION

The present invention provides an adjustable, temporary step for mounting on the front bumper of heavy-duty motor vehicles such as trucks and buses. This bumper step includes a pair of widely spaced, parallel, L-shaped structural members, where each L-shaped member has a generally horizonal support arm and a generally perpendicular, raised vertical post. A wide platform panel is attached across the two support arms. Each vertical post is provided with a pair of vertically spaced through bolts that are adjustably mounted to the post. The top bolt has a down-turned hook on its outermost end for engagement over a top flange of a bumper, while the bottom bolt has a rubber or plastic fitting formed on its outermost end for engagement with a front wall of a bumper to stabilize the bumper step.

BRIEF DESCRIPTION OF THE DRAWINGS

This invention will be better understood from the following description taken in conjunction with the accompanying draings, and its scope will be pointed out in the appended claims.

FIG. 5 is a left side elevational view of a second modification of the present invention, similar to that of FIG. 3, showing a quick connection means in the form of a slip nut rod extending between the two bottom bolts.

FIG. 6 is a fragmentary top plan view taken on the line 6—6 of FIG. 5 showing an elongated adjustable bar joined to both bottom bolts and serving as the quick connection mean.

FIG. 7 is a fragmentary view, on an enlarged scale, taken on the line 7—7 of FIG. 6 and showing the quick connect relationship between the elongated adjustable rod that extends between the two bottom bolts.

FIG. 8 is a fragmentary cross-sectional view taken on the line 8—8 of FIG. 7 and showing the relationship between the threaded bottom bolt and the elongated hole in the elongated adjustable rod for receiving the threaded bolt therein with a slip fit in the manner of a split nut.

DESCRIPTION OF THE PREFERRED EMBODIMENTS

Figure 1:
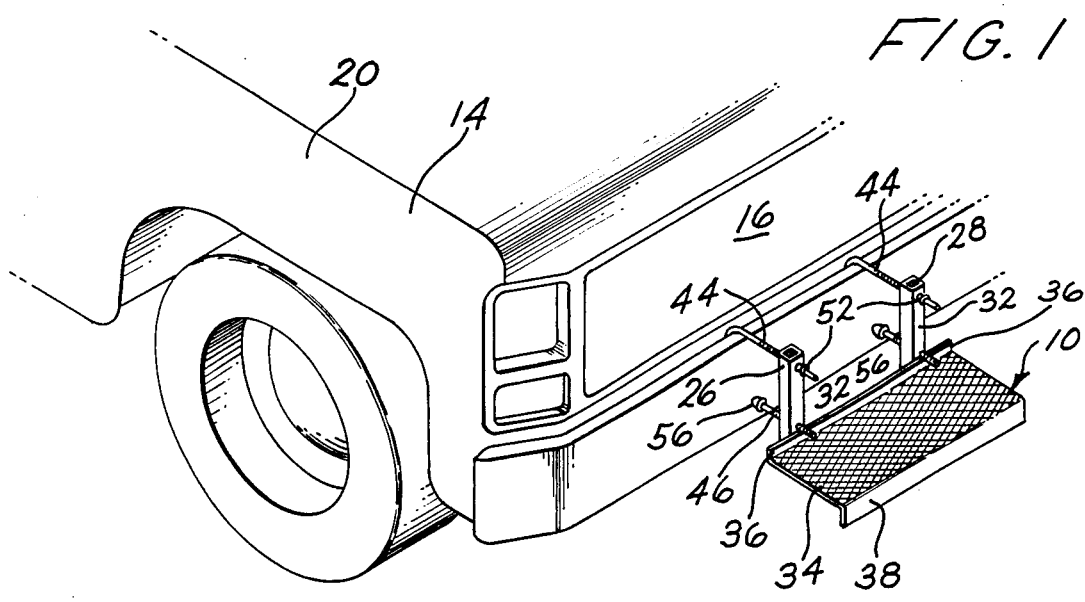
FIG. 1 is a fragmentary front perspective view showing the front end of a truck, with the front bumper step of the present invention mounted thereon.

Turning now to a consideration of the drawings and, in particular, to the front perspective view of FIG. 1, there is shown a front bumper step 10 embodying the present invention. It is shown supported from the front bumper 12 of a truck 14 or other heavy-duty motor vehicle such as a bus or van. The front grille 16 is shown above the bumper, and the hood 18 is shown above the front grille and extending between the front fenders 20.

Figure 2:
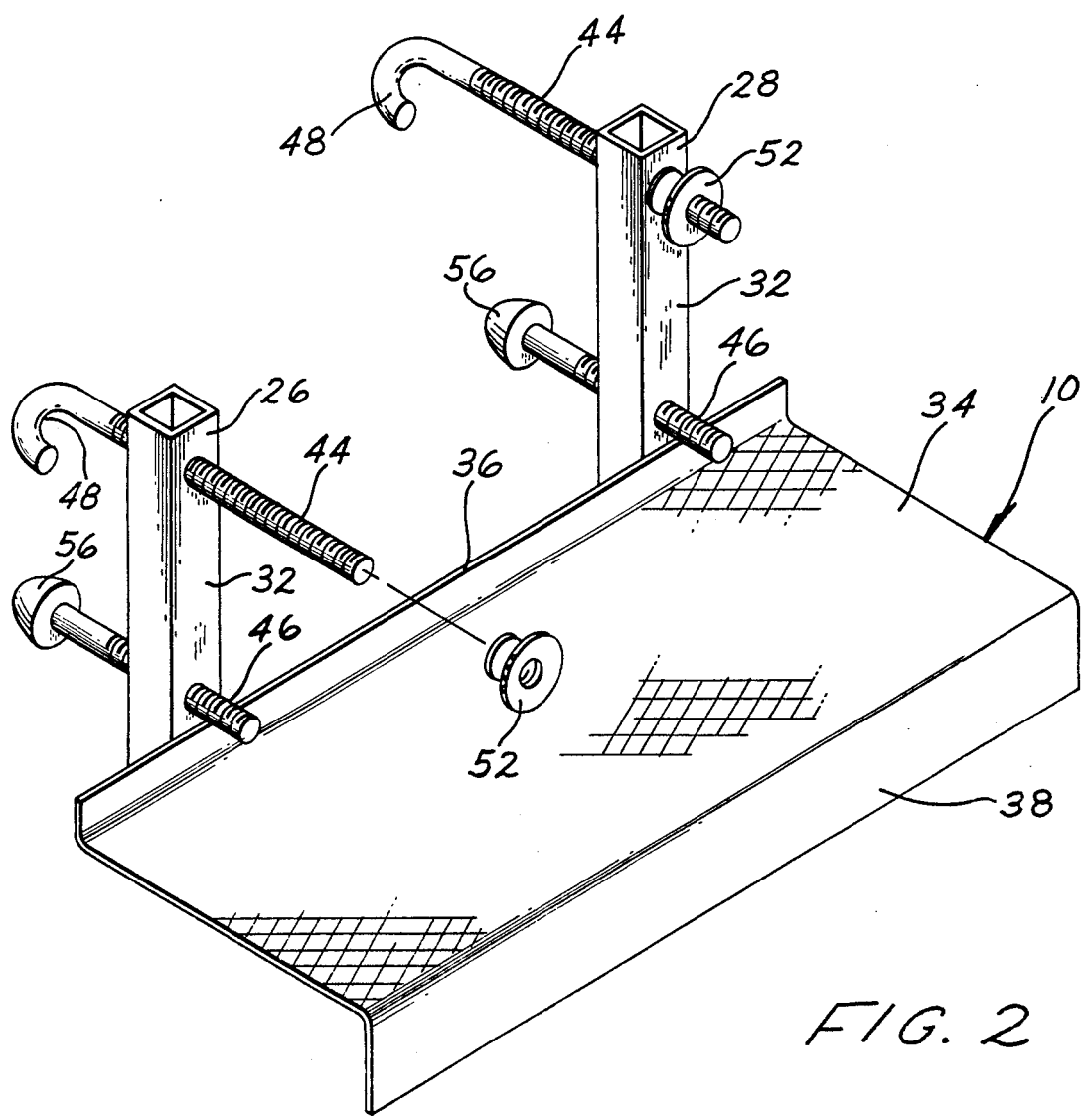
FIG. 2 is an enlarged perspective view of the front bumper step of FIG. 1 giving more of the details of construction.

This front bumper step 10 is a lightweight, portable, universal design for use with an unlimited number of different sizes and shapes of front bumpers. Reference will now be made to both FIGS. 2 and 3 in the description of the various elements of the bumper step 10. There is a pair of widely spaced, parallel, L-shaped structural members 26 and 28 formed of thin wall square tubing where each L-shaped member has a generally horizonal support arm 30 and a generally p erpendicular, raised, vertical post 32. This L-shaped member may either be formed of two lengths of square tubing that are welded together or a single length that is bent into the L-shape. A wide platform panel 34 of aluminum deck plate, or the like, with an embossed top surface is attached across the top of the support arms 30, 30. The rear edge of this platform panel 34 is folded up into a flange 36 to prevent the user's feet from slipping down between the step and the bumper. Moreover, the front edge of the platform panel is folded into a down-turned flange 38 so that the user won't injure his shins on a sharp edge, and also to serve as a reinforcement for the platform panel 34.

Figure 3:
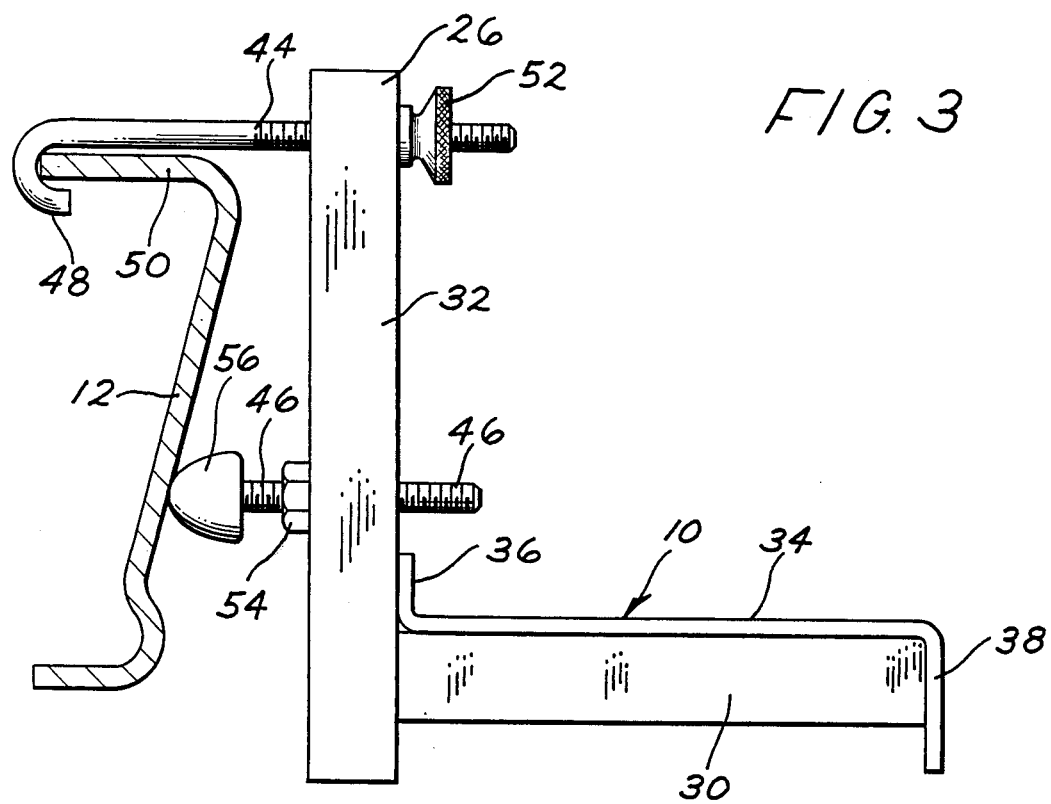
FIG. 3 is a left side elevational view of the front bumper step of FIG. 1 showing the truck bumper in cross section.

Each vertical post 32 is provided with a pair of vertically spaced threaded bolts 44 and 46 that are adjustably mounted to the post. The top bolt 44 has a down-turned hook 48 formed on its outermost end, and it is adapted for engagement over a top flange 50 of the truck bumper 12. Since the vertical post is formed of thin wall square tubing, the hole (not shown) for receiving each of the two bolts 44 and 46 through the post are plain and slightly oversize. An enlarged nut 52 that serves the same function as a butterfly nut is fitted on the free end of the top bolt 44, and it is adjusted until the length of the top bolt is correct relative to the top flange 50 of the bumper and the bottom bolt 46. It should be noted that the bumper 12 in FIG. 1 is slightly different in configuration from the bumper 12 in FIG. 3. The bumper in FIG. 3 has an inclined front wall, while the front wall of the bumper 12 in FIG. 1 is generally vertical. The bottom bolt 46, as shown in FIG. 3, is threaded into a nut 54 that is welded to the rear face of the post 32 and centered over an opening (not shown) in the post that receives the bottom bolt 46. Thus, the internal threads of the nut 54 serve to cooperate with the threads of the bottom bolt 46 for adjustably mounting the bottom bolt relative to the post 32. Notice that the end of the bottom bolt 46 on the rear of the bumper step is fitted with a rubber or plastic fitting 56 that is arranged to engage the front surface of the truck bumper 12 to stabilize the bumper step 10 while not injuring the decorative finish of the bumper.

Figure 4:
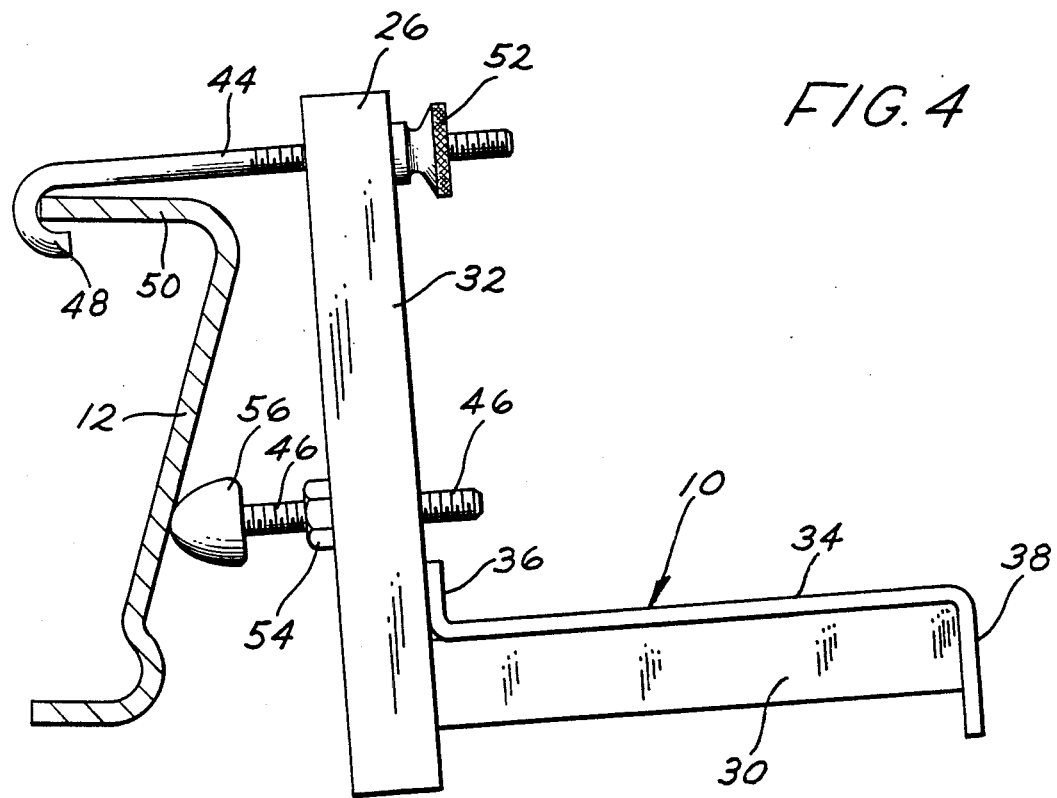
FIG. 4 is another left side elevational view, similar to that of FIG. 3, showing the supporting bolts adjusted so as to incline the platform panel in an upward direction so as to shift the center of gravity of the user toward the vehicle so that the feet of the user will not be inclined to slip off of the platform panel and cause injury to himself.

Notice, in studying both FIGS. 3 and 4, how the top bolt 44 can be lengthened as well as the bottom bolt 46 so as to incline the bumper step 10 upwardly so that when the user is standing with both feet on the platform panel 34 the incline of the platform panel will cause the user's center of gravity to shift forward toward the vehicle and will serve to prevent the feet of the user from slipping off of the platform panel and possibly causing injury.

FIGS. 5–8 show a second modification of the present invention of a front bumper step 60 where similar elements that are found in the first modification will be given the same reference numerals. The main difference in this second modification step 60 is the manner of adjusting and locking the pair of bottom bolts 46, 46. Neither bolt 46 screws into a fixed nut 54 of the first modification. Instead, an elongated adjustable rod 62 is arranged in a horizontal manner to connect between the two bottom posts 46, 46, as is best seen in the fragmentary top plan cross-sectional view of FIG. 6. Looking at the fragmentary top plan cross-sectional view of FIG. 8, the post 32 is shown with an enlarged through hole 64 that extends through the opposite walls of the hollow post for loosely receiving the threaded bolt 46 therethrough. The elongated adjustble rod 62 is arranged in the same horizontal plane as the two bottom bolts 46, 46. The two vertical posts 32, 32 each have a through hole 66 that is arranged perpendicular to the enlraged through hole 64 for receiving the end of the elongated adjustable rod 62 therein in a close-fitting relationship. The portion of the elongated rod 62 that is located within each hollow post 32, 32 is provided with an elongated hole 68 that is best seen in FIGS. 7 and 8. One end wall of this elongated hole is provided with a concave, semicircular, threaded configuration 70 which represents half of a threaded hole, while the width of the elongated hole 68 is about equal to the diameter of the threaded bolt 46. When this threaded end wall 70 is in engagement with the threads of the bolt 46, then the two bottom bolts 46, 46 are locked in place.

Looking again at the top plan view of FIG. 6, there is a compression spring 72 that is slipped onto the elongated rod 62. One end 74 of this compression spring bears against the side of the vertical post 28 while the opposite end 76 of the compression spring is confined by a through pin, or stop, 78. Thus, the compression spring 72 is maintained in compression, and it tends to urge the elongated adjustable rod 62 to the left, in the direction of arrow 80, so as to normally hold the threaded end wall 70 into locking engagement with the threaded bolt 46. When the user wishes to adjust the position of the two bottom bolts 46, 46, he merely needs to grasp the elongated rod 62 and urge it to the right to further compress the spring 72 and thereby withdraw the threaded end wall 70 from engagement with the threaded bolt 46 as shown in FIG. 8. Then the position of the two bottom bolts 46, 46 can be adjusted with the user's other free hand, and then the user would release his grasp on the elongated rod 62 and allow the compression spring 72 to assume the locking position shown in FIG. 6. Thus, this second modification 60 of the present invention allows for the making of a quick locking connection between the two bottom bolts 46, 46. Eacn end of the elongated rod 62 acts in the manner of a split nut so that it is not necessary to turn the bottom bolts 46, 46 in order to adjust their length relative to the vertical posts 32, 32.

Modifications of this invention will occur to those skilled in the art. Therefore, it is to be understood that this invention is not limited to the particular embodiments disclosed, but that it is intended to cover all modifications which are within the true spirit and scope of this invention as claimed.

What is claimed is:

1. An adjustable, temporary step for mounting on the front bumper of heavy-duty motor vehicles such as trucks and buses, said step comprising:
   a. a pair of widely spaced, parallel, L-shaped structural members, each L-shaped member being formed of hollow square tubing and having a generally horizontal support arm and a generally perpendicular, raised vertical post;
   b. a platform panel attached across the two support arms;
   c. each vertical post being provided with a pair of vertically spaced through bolts that are adjustably mounted to the post, the top bolt having a down-turned hook formed on its outermost end and adapted for engagement over a top flange of a bumper, while the bottom bolt has a non-mar fitting formed on its outermost end and adapted for engagement with a front wall of a bumper, each pair of vertically spaced through bolts having threaded shanks, and each post having enlarged holes for loosely receiving the pair of bolts therethrough, the top bolt being fitted with an enlarged hand-turnable nut on its free end; and
   d. a horizontal, elongated, adjustable rod for making a quick connection between the two bottom bolts and the related vertical posts, each vertical post also having side through holes on opposite side-walls of the post and being in the same horizontal plane as the adjacent enlarged holes through which the bottom bolts extend, the elongated adjustable rod extending completely through each side through hole of each post from one post to the other, the portion of the elongated rod within each hollow post being provided with an elongated hole for receiving the threaded bottom bolt therein with a slip fit, one end wall of each elongated hole being provided with a concave, semicircular, threaded configuration for locking engagement with the threads of the adjacent bottom bolt when the rod is shifted into engagement therewith, the opposite end wall of each elongated hole being provided with an enlarged portion for permitting free axial movement of the bottom bolt, and a compression spring fitted on the elongated rod and bearing against at least one post for shifting the elongated rod into locking engagement with the two bottom bolts whereby the position of the bottom bolts may be altered after the elongated rod has been shifted against the action of the compression spring.

2. The front bumper step invention as recited in claim 1 wherein the said platform panel is a deck plate with an embossed finish, wherein the panel extends across the top surface of the two support arms and beyond, the platform panel having a front edge that is folded down across the front ends of the two support arms.

* * * * *